(12) United States Patent
Zheng et al.

(10) Patent No.: US 9,557,618 B2
(45) Date of Patent: Jan. 31, 2017

(54) DISPLAY PANEL

(71) Applicant: Shenzhen China Star Optoelectronics Technology Co., Ltd., Shenzhen, Guangdong (CN)

(72) Inventors: Hua Zheng, Guangdong (CN); Jinbo Guo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 253 days.

(21) Appl. No.: 14/356,238

(22) PCT Filed: Jan. 22, 2014

(86) PCT No.: PCT/CN2014/071045
§ 371 (c)(1),
(2) Date: May 5, 2014

(87) PCT Pub. No.: WO2015/096252
PCT Pub. Date: Jul. 2, 2015

(65) Prior Publication Data
US 2015/0185532 A1     Jul. 2, 2015

(30) Foreign Application Priority Data
Dec. 27, 2013 (CN) .......................... 2013 1 0739598

(51) Int. Cl.
*G02F 1/1335* (2006.01)
*G02F 1/1343* (2006.01)
(Continued)

(52) U.S. Cl.
CPC .......... *G02F 1/13624* (2013.01); *G02F 1/1368* (2013.01); *G02F 1/134336* (2013.01);
(Continued)

(58) Field of Classification Search
CPC .................. G02F 2001/134345; G02F 1/1368; G02F 1/13454; G02F 1/136286; G02F 1/13624; G02F 2201/52; G09G 3/3611; G09G 3/3659; G09G 2300/0447; G09G 3/3648; G09G 2310/0297; G09G 2300/0426; G09G 2300/0452
(Continued)

(56) References Cited

U.S. PATENT DOCUMENTS

| 2013/0069918 A1* | 3/2013 | Hou .................... H04N 13/0434 345/204 |
| 2014/0160186 A1* | 6/2014 | Oh ........................ G09G 3/3614 345/694 |
| 2014/0209932 A1* | 7/2014 | Huang .................. H01L 27/124 257/88 |

FOREIGN PATENT DOCUMENTS

| CN | 201859285 U | 6/2011 |
| CN | 102243827 A | 11/2011 |

(Continued)

*Primary Examiner* — Huyen Ngo
(74) *Attorney, Agent, or Firm* — Andrew C. Cheng (57) ABSTRACT

A display panel includes a plurality of primary pixel units. Each primary pixel unit includes two primary pixels arranged horizontally. Each of the primary pixels comprises a plurality of subpixels arranged vertically and comprising different colors, and arrangements of the plurality of subpixels with different colors of the adjacent primary pixels being different. The result of the arrangement is neutralization of the adjacent primary pixels, and the neutral effect is "red with white tone." So color shift caused by the overloaded data line is prevented, which effectively improves color shift occurring in the 3G1D LCD panel and enhances the display effect of the LCD panel.

1 Claim, 11 Drawing Sheets

(51) Int. Cl.
*G02F 1/1362* (2006.01)
*G02F 1/1368* (2006.01)
*G09G 3/36* (2006.01)

(52) U.S. Cl.
CPC .............. *G09G 3/3648* (2013.01); *G02F 2001/134345* (2013.01); *G02F 2201/52* (2013.01); *G09G 2300/0452* (2013.01); *G09G 2320/0223* (2013.01); *G09G 2320/0233* (2013.01); *G09G 2320/0666* (2013.01)

(58) Field of Classification Search
USPC ..... 345/204, 87, 88; 349/108, 106, 141–144
See application file for complete search history.

(56) References Cited

FOREIGN PATENT DOCUMENTS

| | | |
|---|---|---|
| CN | 103149759 A | 6/2013 |
| CN | 103185995 A | 7/2013 |
| CN | 103185996 A | 7/2013 |
| JP | 2004317726 A | 11/2004 |

* cited by examiner

——— Voltage applied to a blue subpixel
——— Voltage applied to a green subpixel
——— Voltage applied to a red subpixel

Fig. 9c

——— Voltage applied to a blue subpixel
——— Voltage applied to a green subpixel
——— Voltage applied to a red subpixel

DISPLAY PANEL

BACKGROUND OF THE INVENTION

1. Field of the Invention

The present invention relates to a flat display, and more particularly to a display panel.

2. Description of the Prior Art

LCDs (liquid crystal displays) have many merits such as their thin shell, low power consumption, no radiation, etc., so they are widely used. Nowadays, backlight LCDs are commonly used in the market. A backlight LCD comprises a shell, an LCD panel installed in the shell, and a backlight module installed in the shell. The working principle of the LCD panel is as follows: Liquid crystal molecules are injected between two glass substrates. The glass substrates are arranged in parallel. The alignment of the liquid crystal molecules changes depending on the power-on and power-off status to refract a light beam from the backlight module. A color image is produced through the pixels disposed in the glass substrates.

Figure 1:
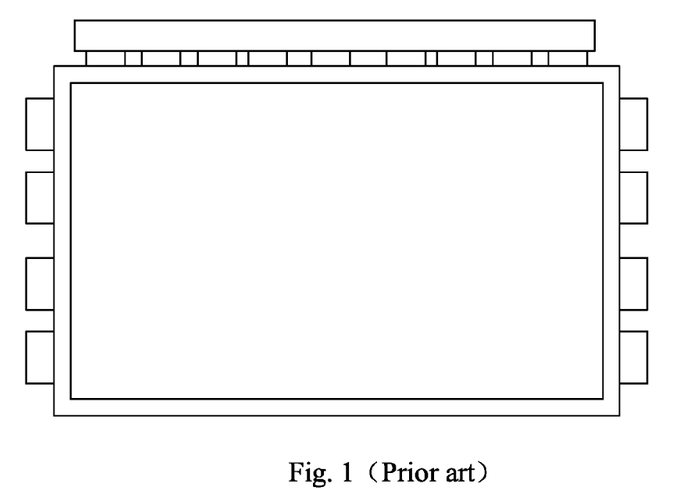
FIG. 1 shows a conventional LCD panel.
Figure 2:
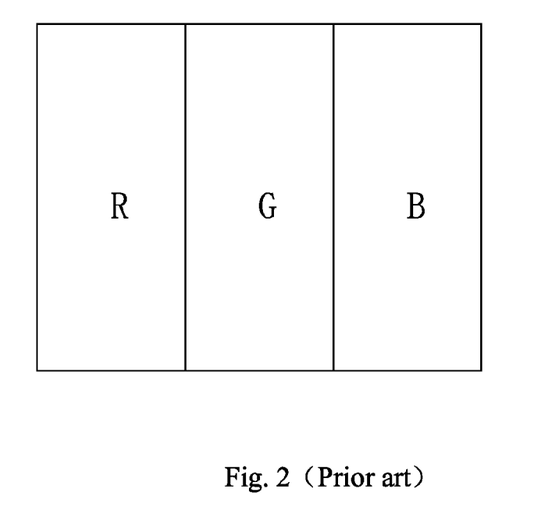
FIG. 2 shows a primary pixel comprising subpixels arranged horizontally.
Figure 3:
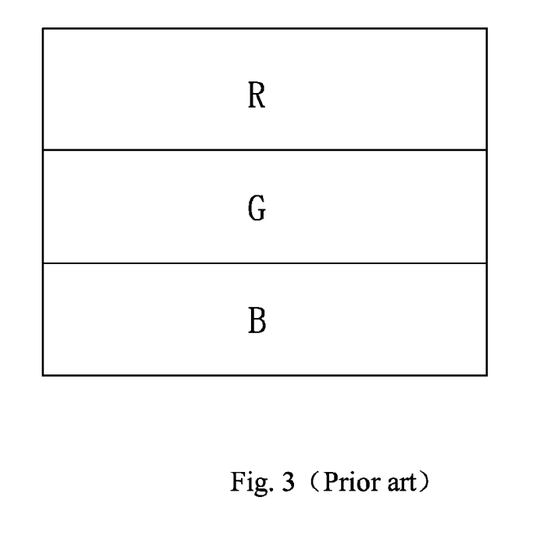
FIG. 3 shows a primary pixel comprising subpixels arranged vertically.

Please refer to FIGS. 1 to 3 showing the LCD panel comprising a TFT. The TFT comprises pixels comprising subpixels. Common arrangements of the subpixels are horizontal arrangement and vertical arrangement.

Figure 4:
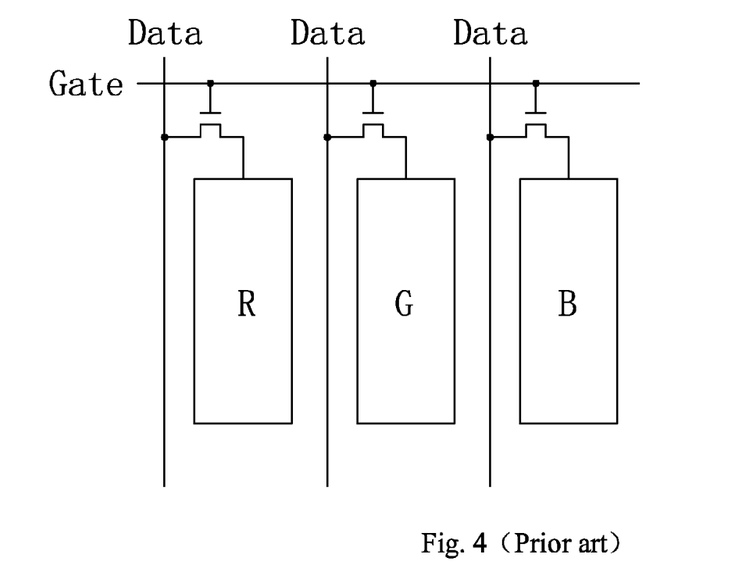
FIG. 4 shows a diagram of driving the primary pixel comprising subpixels arranged horizontally.
Figure 5:
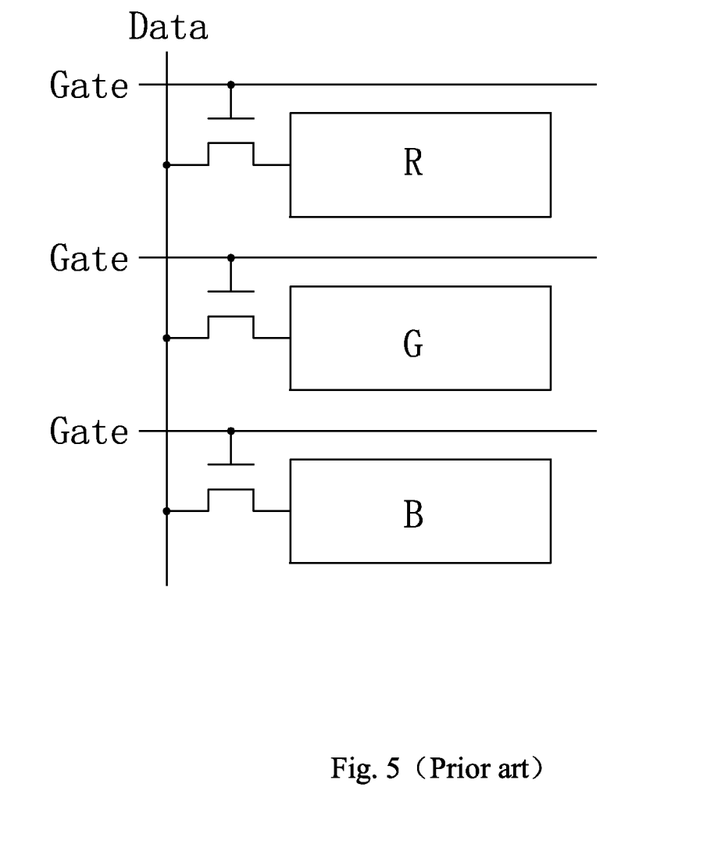
FIG. 5 shows a diagram of driving the primary pixel comprising subpixels arranged vertically.

Take an LCD panel comprising a TFT which only comprises a red subpixel R, a green subpixel G, and a blue subpixel B for example. The horizontal arrangement of the subpixels corresponds to "one scan line (Gate) three data line (Data) drive," which is called 1G3D Mode for short (as FIG. 4 shows). The vertical arrangement of the subpixels corresponds to "three scan line (Gate) one data line (Data) drive," which is called 3G1D Mode for short (as FIG. 5 shows).

Figure 6:
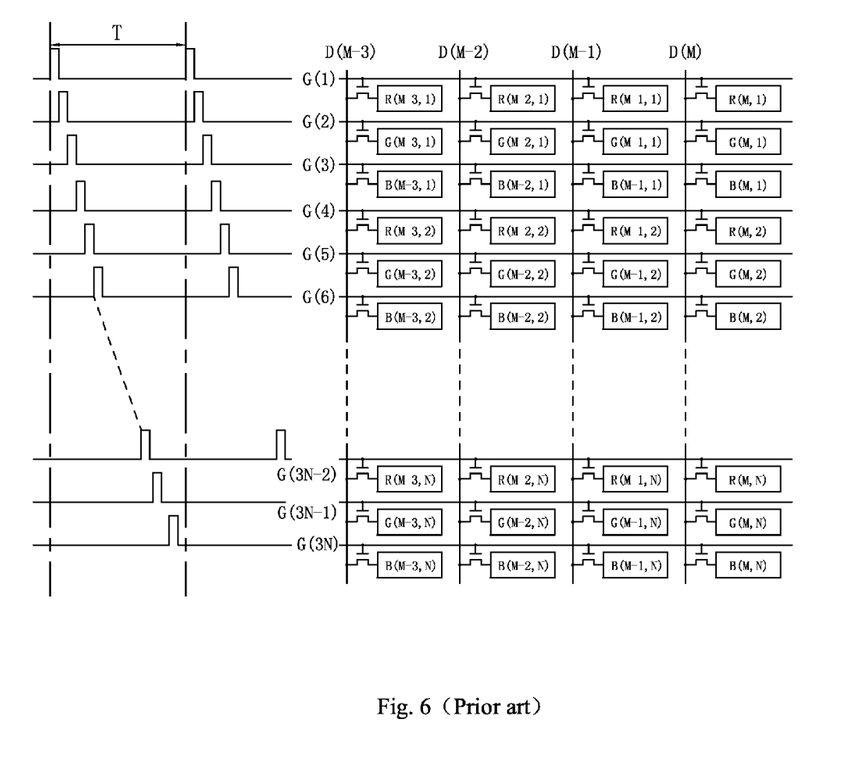
FIG. 6 shows a diagram of driving a 3G1D display panel.

The 3G1D panel is driven by means of progressive scanning. As FIG. 6 shows, at first, a first scan line G(1) is selected and conducted in a time cycle T in a frame. A signal of the data line (voltage) is written to subpixels in the first row (red subpixels R in FIG. 6); that is, the voltage applied on the data line D(x) in the X column is written to subpixels R(x,1) in the first row of the X column. Next, a second scan line G(2) is selected and conducted. A voltage applied on the data line is written to subpixels in the second row (green subpixels G in FIG. 6); that is, the voltage applied on the data line D(x) in the X column is written to subpixels G(x,1) in the second row of the X column . . . . At last, a 3N scan line G(3N) is selected and conducted. N represents total pixels in the vertical direction. A voltage applied on the data line is written to subpixels in the 3N row (blue subpixels B in FIG. 6); that is, the voltage applied on the data line D(x) in the X column is written to subpixels B(x,N) in the 3N row of the X column.

Figure 7A:
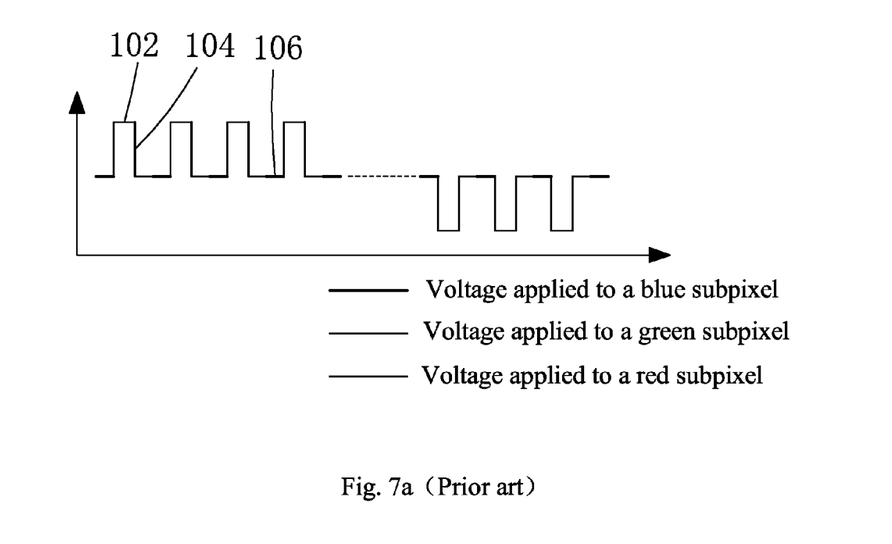
FIG. 7a is a waveform of voltage applied to a subpixel from an external driving chip.
Figure 7B:
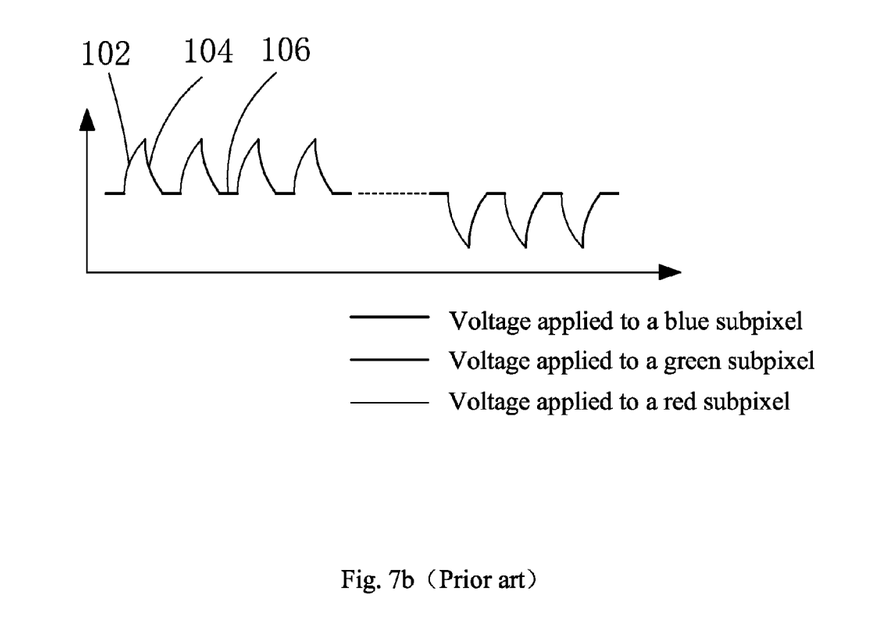
FIG. 7b is a waveform of actual voltage applied to a subpixel.

The risk of showing a one-color image is that the data line is easily overloaded. This causes subpixels to be abnormally charged and results in color shift. Please refer to FIG. 7. Relative to a common voltage, the data line in the panel reverses bias polarization once every frame. Red is shown: (255, 0, 0). The waveform of the voltage output by a surrounding source IC and applied on the data line is shown in FIG. 7a. Section 102, Section 104, and Section 106 represent voltage which should be written to an R subpixel, a G subpixel, and a B subpixel, respectively. Please refer to FIG. 7b. Due to RC delay, Section 102, Section 104, and Section 106 represent voltage which is practically written to the R subpixel, the G subpixel, and the B subpixel, respectively. At this time, the red subpixel R is not fully charged, the green subpixel G is slightly falsely charged, and the blue subpixel B is not charged at all. Color shift (yellowish) occurs to the image.

SUMMARY OF THE INVENTION

The present invention is to provide a display panel for efficiently presenting color shift caused by an overloaded data line and for enhancing the display effect of the LCD panel.

According to the present invention, a display panel comprises a plurality of primary pixel units. Each of the plurality of primary pixel units comprises two primary pixels arranged horizontally, each of the primary pixels comprising a plurality of subpixels arranged vertically and comprising different colors, and arrangements of the plurality of subpixels with different colors of the adjacent primary pixels being different.

Furthermore, the plurality of subpixels are three in quantity, and the three subpixels are a red subpixel, a green subpixel, and a blue subpixel.

Furthermore, the two primary pixels are a first primary pixel and a second primary pixel, and the plurality of subpixels of the first primary pixel are the red subpixel, the green subpixel, and the blue subpixel arranged from top to bottom.

Furthermore, the plurality of subpixels of the second primary pixel are the red subpixel, the blue subpixel, and the green subpixel arranged from top to bottom.

Furthermore, the plurality of subpixels of the second primary pixel are the green subpixel, the red subpixel, and the blue subpixel arranged from top to bottom.

Furthermore, the plurality of subpixels of the second primary pixel are the blue subpixel, the green subpixel, and the red subpixel arranged from top to bottom.

Furthermore, the plurality of subpixels are four in quantity, and the four subpixels are a red subpixel, a green subpixel, a blue subpixel, and a white subpixel.

Furthermore, the two primary pixels are a third primary pixel and a fourth primary pixel, and an arrangement of the plurality of subpixels of the third primary pixel is the red subpixel, the green subpixel, the blue subpixel, and the white subpixel from top to bottom.

Furthermore, the plurality of subpixels of the fourth primary pixel are a white subpixel, a blue subpixel, a green subpixel, and a red subpixel arranged from top to bottom.

Furthermore, the display panel is a liquid crystal display panel.

According to the present invention, a display panel comprises a plurality of primary pixel units. Each of the plurality of primary pixel units comprises two primary pixels arranged horizontally, each of the primary pixels comprising a plurality of subpixels arranged vertically and comprising different colors, and arrangements of the plurality of subpixels with different colors of the adjacent primary pixels being different. The display panel is a liquid crystal display panel. The plurality of subpixels are three in quantity, and the three subpixels are a red subpixel, a green subpixel, and a blue subpixel.

Furthermore, the two primary pixels are a first primary pixel and a second primary pixel, and the plurality of subpixels of the first primary pixel are the red subpixel, the green subpixel, and the blue subpixel arranged from top to bottom.

Furthermore, the plurality of subpixels of the second primary pixel are the red subpixel, the blue subpixel, and the green subpixel arranged from top to bottom.

Furthermore, the plurality of subpixels of the second primary pixel are the green subpixel, the red subpixel, and the blue subpixel arranged from top to bottom.

Furthermore, the plurality of subpixels of the second primary pixel are the blue subpixel, the green subpixel, and the red subpixel arranged from top to bottom.

In the present invention, the subpixels which two adjacent primary pixels comprise are arranged in different orders. The subpixels have different colors. The result of the arrangement is neutralization of the adjacent primary pixels, and the neutral effect is "red with white tone." So color shift caused by the overloaded data line is prevented, which effectively improves color shift occurring in the 3G1D LCD panel and enhances the display effect of the LCD panel. These are the advantages of the present invention.

These and other objectives of the present invention will become apparent to those of ordinary skill in the art after reading the following detailed description of the preferred embodiment that is illustrated in the various figures and drawings.

DETAILED DESCRIPTION OF THE PREFERRED EMBODIMENTS

The present invention is described in detail in conjunction with the accompanying drawings and embodiments.

Figure 8:
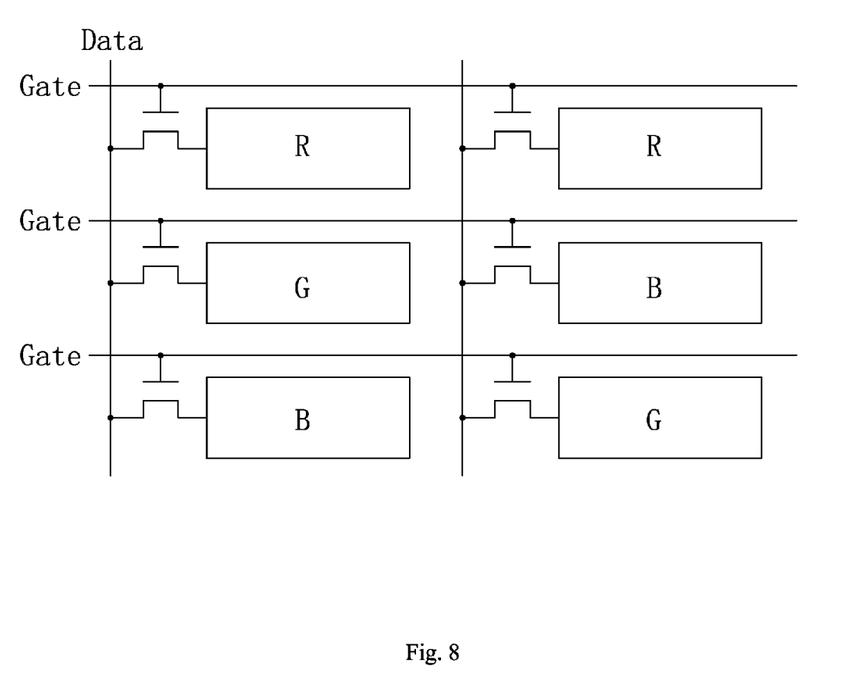
FIG. 8 shows a display panel according to the present invention.

Please refer to FIG. 8 showing a display panel according to the present invention. The display panel comprises a plurality of primary pixel units. Each of the plurality of primary pixel units comprises two primary pixels arranged horizontally. Each of the primary pixels comprises a plurality of subpixels arranged vertically. The plurality of subpixels comprise different colors. The arrangement of the subpixels with different colors of a primary pixel is different from that of the subpixels with different colors of an adjacent primary pixel.

In this embodiment of the present invention, the display panel is a 3G1D LCD panel. The plurality of subpixels are three in quantity, that is, a red subpixel R, a green subpixel G, and a blue subpixel B. The primary pixels are a first primary pixel and a second primary pixel. The plurality of subpixels of the first primary pixel are the red subpixel R, the green subpixel G, and the blue subpixel B arranged from top to bottom. The plurality of subpixels of the second primary pixel are the red subpixel R, the blue subpixel B, and the green subpixel G arranged from top to bottom.

Figure 9A:
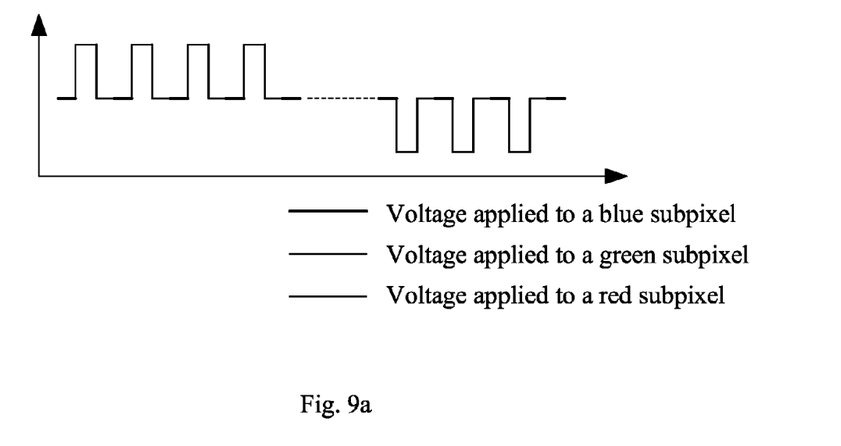
FIG. 9a shows a waveform of voltage applied to subpixels of the first primary pixel from an external driving chip according to a first embodiment of the present invention.
Figure 9B:
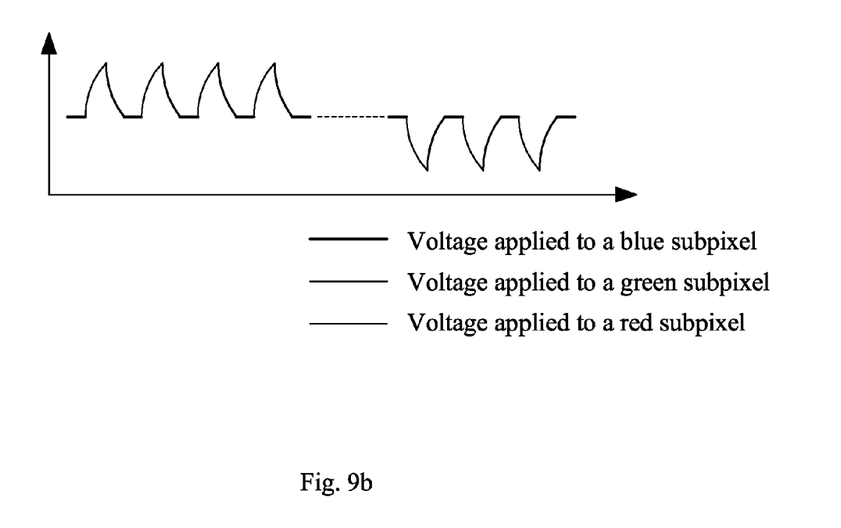
FIG. 9b shows a waveform of actual voltage applied to subpixels of the first primary pixel from an external driving chip according to a first embodiment of the present invention.
Figure 9C:
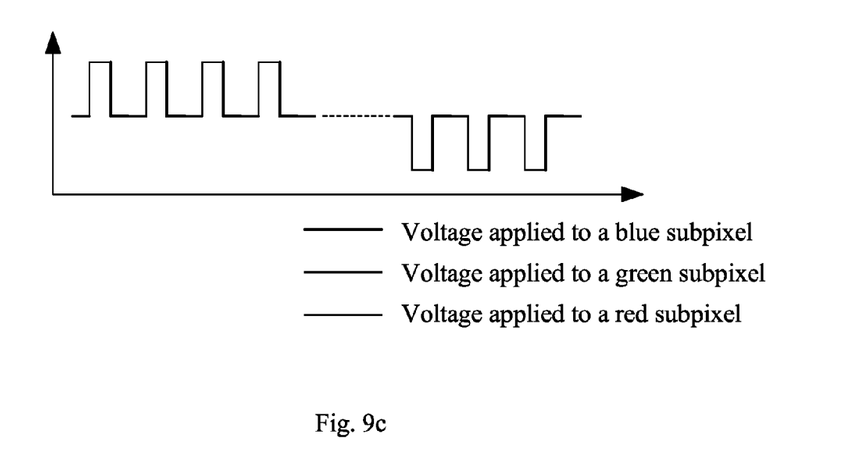
FIG. 9c shows a waveform of voltage applied to subpixels of the second primary pixel from an external driving chip according to a first embodiment of the present invention.
Figure 9D:
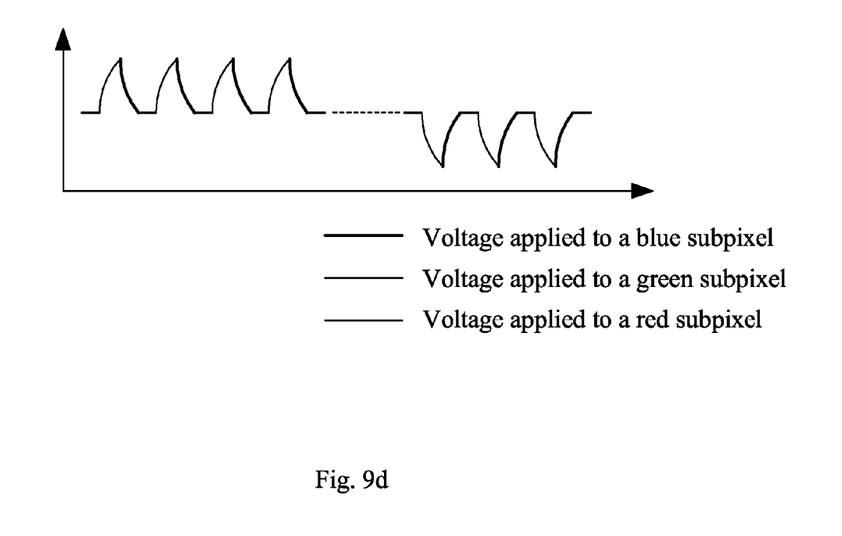
FIG. 9d shows a waveform of actual voltage applied to subpixels of the second primary pixel from an external driving chip according to a first embodiment of the present invention.

Take a one-color image in red (255, 0, 0) for example. FIG. 9a shows a waveform of a voltage applied on a data line when a surrounding source IC writes to the red subpixel R, the green subpixel G, and the blue subpixel B of the first primary pixel. FIG. 9b shows a waveform of the voltage applied on the data line when the source IC practically writes to the red subpixel R, the green subpixel G, and the blue subpixel B of the first primary pixel. FIG. 9c shows a waveform of a voltage applied on the data line when a source IC writes to the red subpixel R, the blue subpixel B, and the green subpixel G of the second primary pixel. FIG. 9d shows a waveform of the voltage applied on the data line when the source IC practically writes to the red subpixel R, the blue subpixel B, and the green subpixel G of the second primary pixel.

As for the red subpixel R, the green subpixel G, and the blue subpixel B of the first primary pixel, the red subpixel R is not fully charged, the green subpixel G is slightly falsely charged, and the blue subpixel B is not charged at all. The real display effect is "red with yellow tone" (normally). As for the red subpixel R, the blue subpixel B, and the green subpixel G of the second primary pixel, the red subpixel R is not fully charged, the blue subpixel B is slightly falsely charged, and the green subpixel G is not charged at all. The real display effect is "red with purple tone."

In this way, the neutral effect is "red with white tone" for the two adjacent primary pixels. It means that color specification does not change and that saturation is lowered. Human eyes are more sensitive to color specification than to saturation. Because of this reason, color shift occurred in the 3G1D LCD panel is effectively improved.

Figure 10:
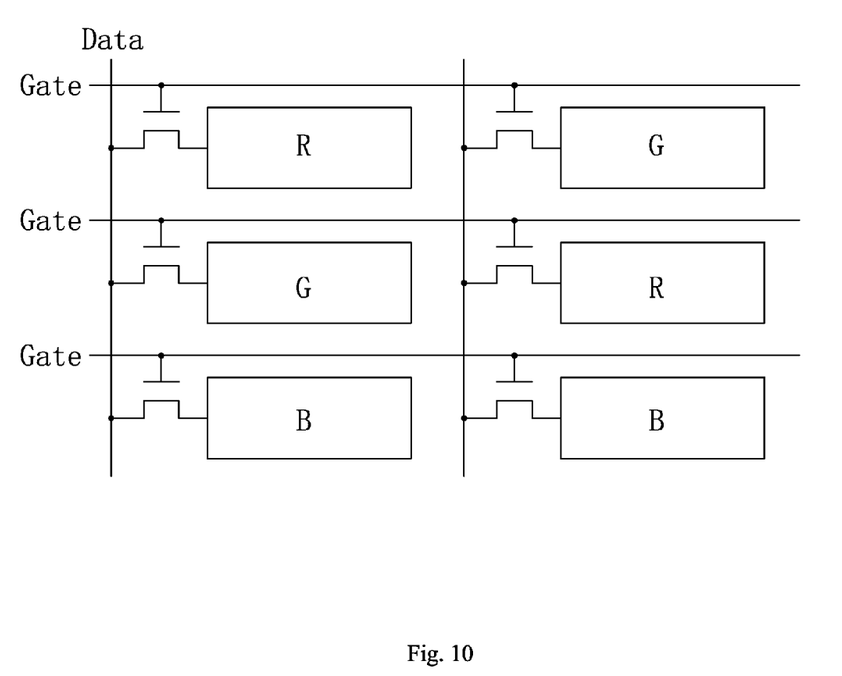
FIG. 10 shows an arrangement of subpixels according to a second embodiment of the present invention.

Please refer to FIG. 10 showing a schematic diagram of an arrangement of pixels according to a second embodiment of the present invention. An arrangement of subpixels of a first primary pixel remains unchanged. An arrangement of subpixels of a second primary pixel is a green subpixel G, a red subpixel R, and a blue subpixel B from top to bottom. The result of the second embodiment is the same as that of the first embodiment.

Figure 11:
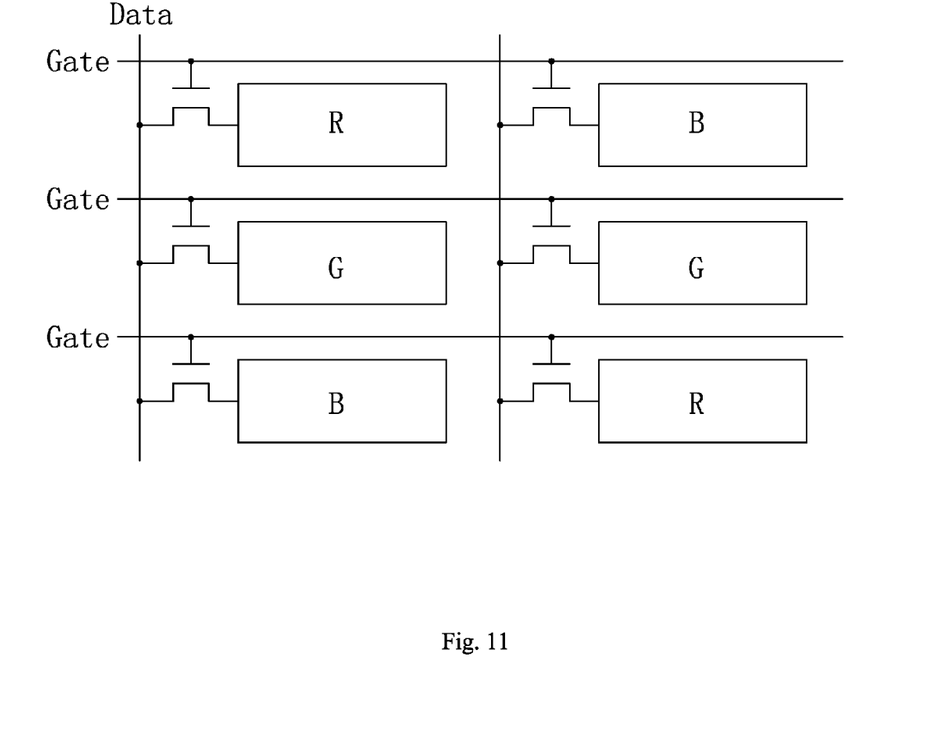
FIG. 11 shows an arrangement of subpixels according to a third embodiment of the present invention.

Please refer to FIG. 11 showing a schematic diagram of an arrangement of pixels according to a third embodiment of the present invention. An arrangement of subpixels of the first primary pixels remains unchanged. An arrangement of subpixels of the second primary pixels is a blue subpixel B, a green subpixel G, and a red subpixel R from top to bottom. The result of the third embodiment is the same as that of the first embodiment.

Figure 12:
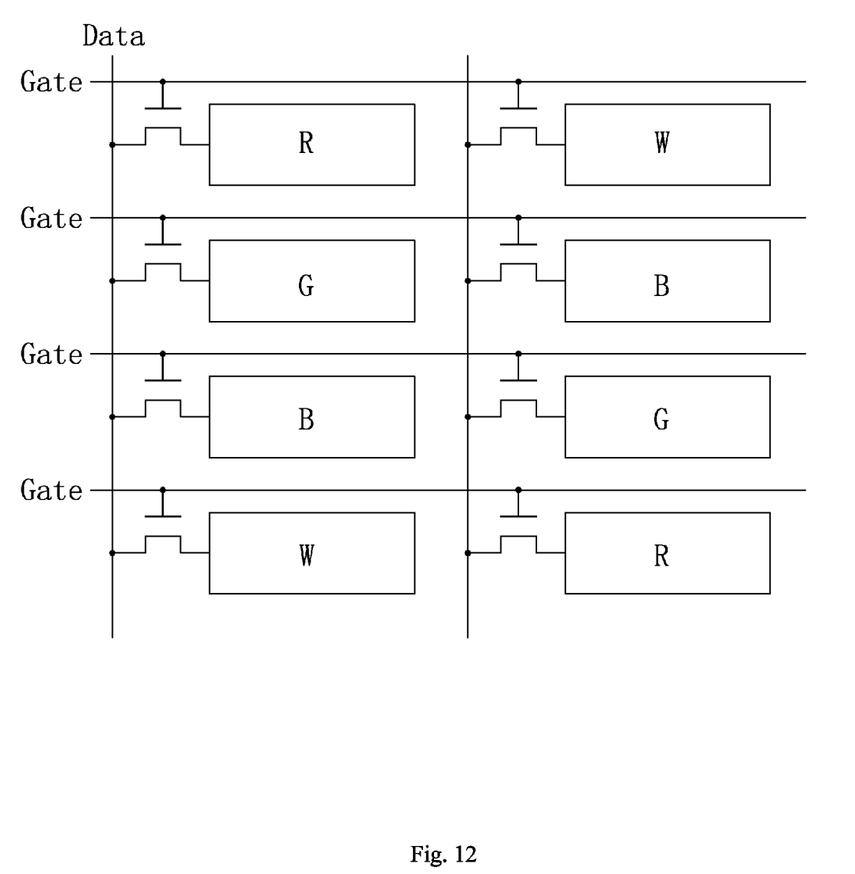
FIG. 12 shows an arrangement of subpixels according to a fourth embodiment of the present invention.

Please refer to FIG. 12 showing a schematic diagram of an arrangement of pixels according to a fourth embodiment of the present invention. Two primary pixels are a third primary pixel and a fourth primary pixel. An arrangement of subpixels of the third primary pixels is a red subpixel R, a green subpixel G, a blue subpixel B, and a white subpixel W from top to bottom. An arrangement of subpixels of the fourth primary pixels is a white subpixel W, a blue subpixel B, a green subpixel G, and a red subpixel R from top to bottom. The result of the fourth embodiment is the same as that of the first embodiment.

In sum, the subpixels which two adjacent primary pixels comprise are arranged in different orders. The subpixels have different colors. The result of the arrangement is neutralization of the two adjacent primary pixels. The neutral effect is "red with white tone." In this way, color shift caused by the overloaded data line is prevented, which effectively improves color shift occurring in the 3G1D LCD panel and enhances the display effect of the LCD panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising a plurality of primary pixel units, each of the plurality of primary pixel units comprising a first primary pixel and a second primary pixel arranged horizontally, each of the primary pixels comprising a plurality of subpixels arranged vertically and comprising different colors, and arrangements of the plurality of subpixels with different colors of the adjacent primary pixels being different, wherein the first primary pixel comprises a first red subpixel coupled to a first scan line, a first green subpixel coupled to a second scan line, a first blue subpixel coupled to a third scan line, and a first white subpixel coupled to a fourth scan line, and the second primary pixel comprises a second white subpixel coupled to the first scan line, a second blue subpixel coupled to the second scan line, a second green subpixel coupled to the third scan line, and a second red subpixel coupled to the fourth scan line.

* * * * *